United States Patent [19]

Caswell et al.

[11] Patent Number: 5,231,273

[45] Date of Patent: Jul. 27, 1993

[54] INVENTORY MANAGEMENT SYSTEM

[75] Inventors: Robert L. Caswell, Fullerton; Herbert J. Moore, Anaheim; Marcus P. Escobosa, Placentia, all of Calif.

[73] Assignee: Comtec Industries, Fountain Valley, Calif.

[21] Appl. No.: 682,721

[22] Filed: Apr. 9, 1991

[51] Int. Cl.[5] ........................ G06F 15/24; G08B 5/22
[52] U.S. Cl. .............................. 235/385; 340/825.44; 455/38.3
[58] Field of Search ............ 235/385; 455/38.3, 277.2; 340/825.49, 825.54

[56] References Cited

U.S. PATENT DOCUMENTS

| 4,437,095 | 3/1984 | Akahori et al. | 455/38.3 |
| 4,473,825 | 9/1984 | Walton | 340/825.54 |
| 4,506,386 | 3/1985 | Ichikawa et al. | 455/38.3 |
| 4,636,950 | 1/1987 | Caswell et al. | 235/385 |
| 4,656,472 | 4/1987 | Walton | 340/825.54 |
| 4,736,461 | 4/1988 | Kawasaki et al. | 455/38.3 |
| 4,864,642 | 9/1989 | Ueno et al. | 455/277.2 |
| 4,955,038 | 9/1990 | Lee et al. | 340/825.54 |
| 5,047,998 | 8/1991 | Mizuta | 235/492 |

FOREIGN PATENT DOCUMENTS

| 350007 | 1/1990 | European Pat. Off. | 455/277.2 |
| 280931 | 11/1989 | Japan | 455/38.3 |

Primary Examiner—John Shepperd
Attorney, Agent, or Firm—G. Donald Weber, Jr.

[57] ABSTRACT

An inventory management system which includes a transponder, an interrogation transceiver and control devices utilized therewith. The control devices operate to minimize the power consumption of the transponder while permitting selected, coded operation of the inventory management system. The interrogation transceiver provides linkage to the transponder by means of a modulated radio frequency (RF) carrier during system operation. A transmit/receive switch is also included in the invention to prevent harmful coupling between the transponder receiver and the transponder transmitter. This could occur during data exchanges between the transponder and the interrogation receiver.

12 Claims, 3 Drawing Sheets

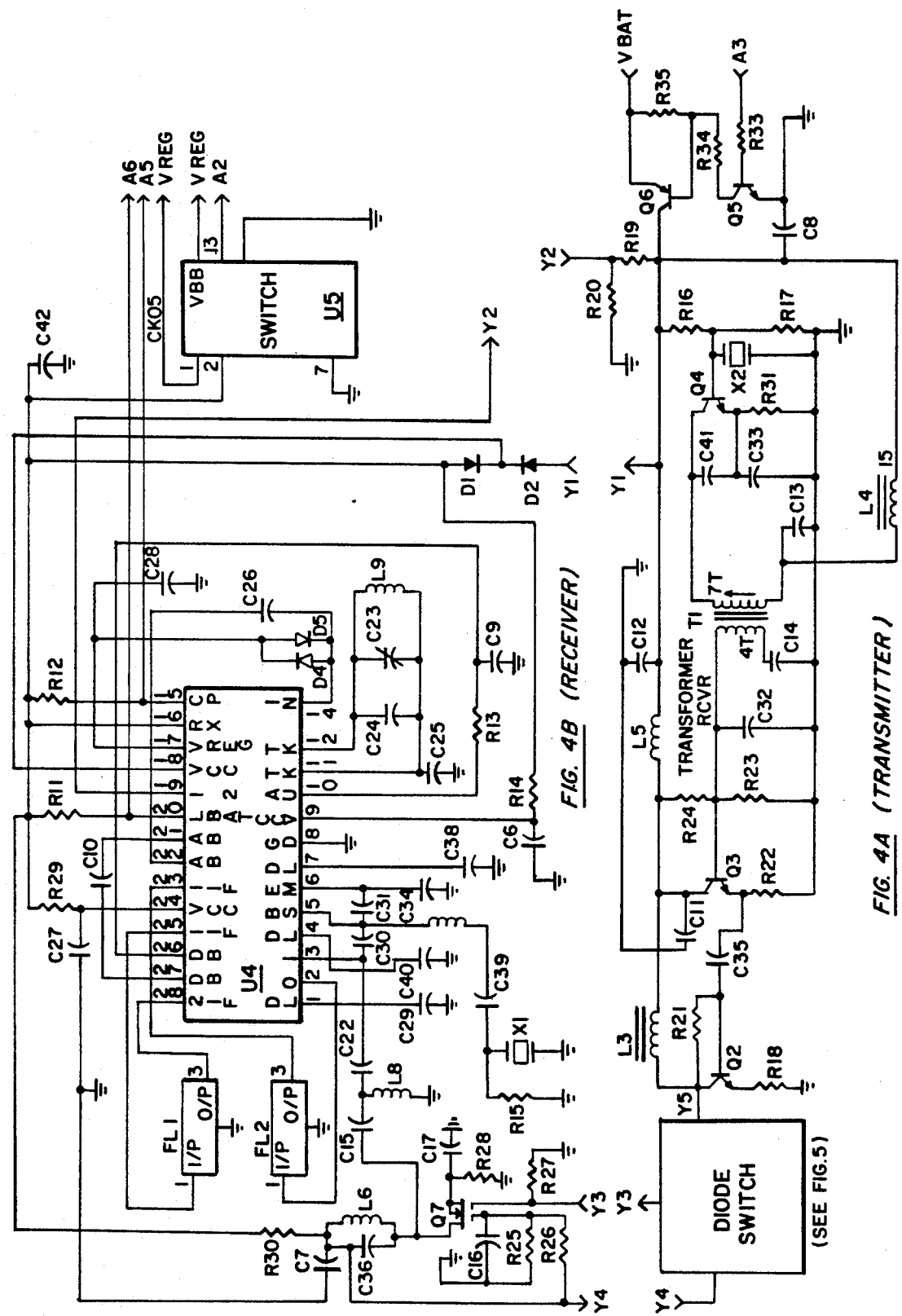

INVENTORY MANAGEMENT SYSTEM

BACKGROUND OF THE INVENTION

1. Field of the Invention

The present invention relates to an apparatus for inventory control, in general, and, more particularly, to a system for the maintenance, management and control of inventory. The invention allows inventory control by manufacturers, distributors, users and/or dealers for the purposes of optimized distribution; close control of and efficient collection for sold units; and generation of current sales data in order to project future sales strategy, marketing analysis, production planning, shipping and distribution planning.

2. Prior Art

Presently, the best-known automated inventory control systems are generally based on a coded pattern consisting of vertical bars known as a bar code pattern. This pattern is imprinted somewhere on the controlled item or its container. This system is used primarily with mass produced, low cost, consumable products. Each bar code pattern identifies a unique item.

Point-of-sale control is implemented with laser beam scanners which interface with a computer system to interpret the code pattern. Pricing and internal inventory maintenance can be established at the discretion of the individual user, controlled by the applicable software. Inventory control may be maintained with portable equipment consisting of a bar pattern scanner and a suitable storage device which can interface with the computer system. This results in a system which has a response time which can be significantly poorer than desired and errors by the human operator limit data integrity.

Often these known systems are used to monitor or control massive numbers of relatively inexpensive, consumable products with a single code to identify each item. The most familiar example to most persons is the supermarket checkout scanner and the UPC product codes. Characteristics of that application are rapid inventory turnover and sales of random combinations of such items in moderate quantities (e.g. 20-50) at frequent intervals. Sales and/or transactions take place at a checkstand attended by a cashier with immediate billing by distributors with short term payment by retailers and individual examination of each item with direct line-of-sight between the bar code pattern and the scanning device.

Most other existing inventory control methods involve direct (or actual) count of individual items. The resulting data may be further processed by computer. If computer processing is desired, the hand-counted information must be manually input into the computer. In retailing of durable goods, this category includes products sold in large numbers (10-20 million annually) with an immense economical impact to the inventory owner. Currently, this market incurs a large expense to control inventory and protect investments.

These types of products are relatively high cost, major purchase items (with individual serial numbers) that have extended floor time at the dealer's location and usually require financing of the dealer's inventory.

Each unit must be identified and tracked from manufacturer to distributer and into the dealer network until the time of sale. The procedure of inspection and identification by serial number is a labor-intensive, hands-on technique that is expensive for several reasons. In addition to the expense incurred in collection, the data is often flawed resulting in a faulty database for decision making. For example, warehouse control is imperfect. Thus, the distributor may have units which are not exposed for sale at the optimum time, resulting in a situation where many units remain unsold at the end of the model year. This frequently results in a requirement to shift models to other warehouse locations. Expenses are incurred for shipping, accounting, distribution and warehouse in/out charges. Unsold units in warehouses can accumulate storage fees and create a backlog of non-current models. In reasonable economic circumstances, these units must be discounted to encourage sales at the cost of lost profits. In difficult economic times, disposal of an excessive supply of non-current models is more difficult. In addition, serious problems in the introduction of new models to maintain competitive positions are created. Moreover, correction of errors is often necessary and creates handling and accounting expenses.

Control at dealer's locations is even more difficult. Floor check fees based on unit count make it difficult to count the inventory more than once a month. When the inventory is financed, a substantial amount of the money is tied up with attendant "cost-of-money expense" and collection activities depending on the inventory data. Thus, the system with infrequent checking suffers from errors and associated costs, but more frequent checking inserts errors made in the course of an inventory more frequently and imposes other expenses; it is thus not a solution.

The system has a number of significant error sources. Serial numbers may be misread, misunderstood, or transposed initially or in a subsequent tabulation. Similarly, units may be missed or missing during the counting process. Correction of these errors requires manpower expense by the dealer, checker and/or distributor. Furthermore, all of the data (good or bad) collected by the checkers must be processed for inputting into a computer system. The human factor inherently includes some errors and, thus, more expense to resolve them.

Units not truly part of the inventory may be included in the count. For example, units in for service; units owned by the dealer; units mistakenly paid for while unsold; or units missed in one check and counted subsequently. To check the checker is an additional expense.

Accounting data from the inventory count can be, of course, related to sales data. In many industries using this type of control system, there is considerable delay in receiving and assimilating the sales statistics. There are several ways to acquire this information: direct polling of dealers; tabulation of warranty registrations; and summary reports by commercial marketing statistics companies. The latter are typically one to two months out of date. Dealers are usually heavily involved with daily operations and not enthusiastic about gathering accurate sales figures. Dealers and customers are lax about completing and submitting warranty registrations. Distributors may update warranty reports only monthly. All of these information sources are off line, time consuming, expensive and inaccurate.

Lack of timely sales data can be costly. With outdated data, plus ensuing time to discover the problem and to plan and implement corrective action, plus delays receiving feedback data related to the results of the action taken, a sales campaign may totally founder. Likewise, shifting of various models to other locations may result in great expense with little return. Advertising effectiveness is diminished when dated information is used to control and monitor the resulting sales statistics.

In some industries there is little effective correlation between sales, production, shipping, warehousing and the like, based on up-to-date data. Hence, the problems of left-over models, stock in the wrong warehouse and the like are, to a great extent, built into the system. The economic consequences have been discussed previously.

It is clearly desirable to provide an inventory control and maintenance system which eliminates or reduces these problems in a cost effective fashion.

SUMMARY OF THE INSTANT INVENTION

The invention described herein comprises a system which utilizes microelectronic circuitry in combination with computer devices which can be integrated and operated together to provide a degree of automation heretofore unavailable in the control of inventory. The system includes a small, radio frequency transponder which is attached to the unit of inventory to be tracked. Contained in solid state memory within the transponder is the item serial number, the transponder serial number, or other suitable unique identification code. The device also contains the logic circuitry to process data received on its radio frequency data link including such identification codes. When a received code is matched to the internally contained code by the device logic (and any other protocol requirements are met), the transponder emits a short verification signal to the system interrogation transceivers. A data link can be established through commercial telephone line systems, allowing data received by the interrogation transceiver to be transmitted to a remote computer. The computer can be in a location within the storage complex or thousands of miles away. If necessary, the data can be transmitted to a computer anywhere in the world. Coding and decoding of the computer signals may be accomplished through the use of a modem. A plurality of transceivers, if required, can be employed to provide full coverage of diverse physical facilities for inventory.

BRIEF DESCRIPTION OF THE DRAWINGS

FIGS. 4A and 4B are schematic diagrams of the transponder transmitter and receiver portions of the instant invention.

DESCRIPTION OF A PREFERRED EMBODIMENT

Figure 1:
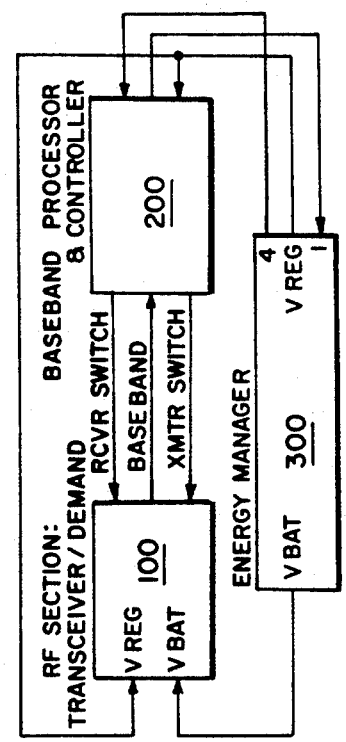
FIG. 1 is a block diagram of the transponder system of the instant invention.

Referring now to FIG. 1, there is shown a block diagram of the transponder of the instant invention. In particular, the RF section 100 comprises a transceiver which includes a transmitter and a receiver. The baseband processor and controller section 200 comprises a microprocessor that provides the overall control and logic function of the system. While not limited thereto, a Motorola 68HC705C8 unit is used in the preferred embodiment.

The energy manager section 300 includes the batteries which are used to power the transponder system. Though the other sections are involved, the energy manager section 300 addresses the biggest challenge in the transponder design, i.e., performing its rather sophisticated electronics task over a period of many years using only the energy supplied by one set of small batteries. In the preferred embodiment, design life is eight years with extensive use contemplated during those years.

Typically, the system uses lithium batteries in order to take advantage of their high energy density. This results in a small battery with long life and reasonable cost. The microprocessor is a CMOS type which is operated at the lowest possible clock rate in order to achieve low power consumption. Similarly, CMOS circuitry is used in the receiver. The transmitter is not so critical in the area of energy usage but must be designed for low cost and reliability. The transmitter uses a great deal of power when it is ON, but it is ON very little during the transponder's operating life whereby actual energy consumption is small.

High sensitivity RF receivers cannot be as energy efficient as the most energy efficient microprocessors and logic circuitry because some active components in receivers operate in a linear rather than switching mode in order to amplify signals of very low power levels. In order to obtain long lifetime under these constraints, the receiver is turned on for as small a portion of the transponder duty cycle as possible while retaining functional utility. The energy manager section 300 is, thus, a key component to the successful operation of the transponder. The energy manager includes a voltage regulator with an ultra-low parasitic current to reduce voltage to levels that are both safe and energy efficient for the proper operation of the transponder circuitry.

The CMOS microprocessor in section 200 also operates for as little of the transponder's duty cycle as possible. Even in the wait mode (when only its clock and timer circuitry are switching) the current consumption thereof is still sufficiently high to be unacceptable for the long lifetimes required in this system. Thus, the only circuitry that operates continuously in a dynamic mode comprises certain parts of the energy manager.

Figure 2:
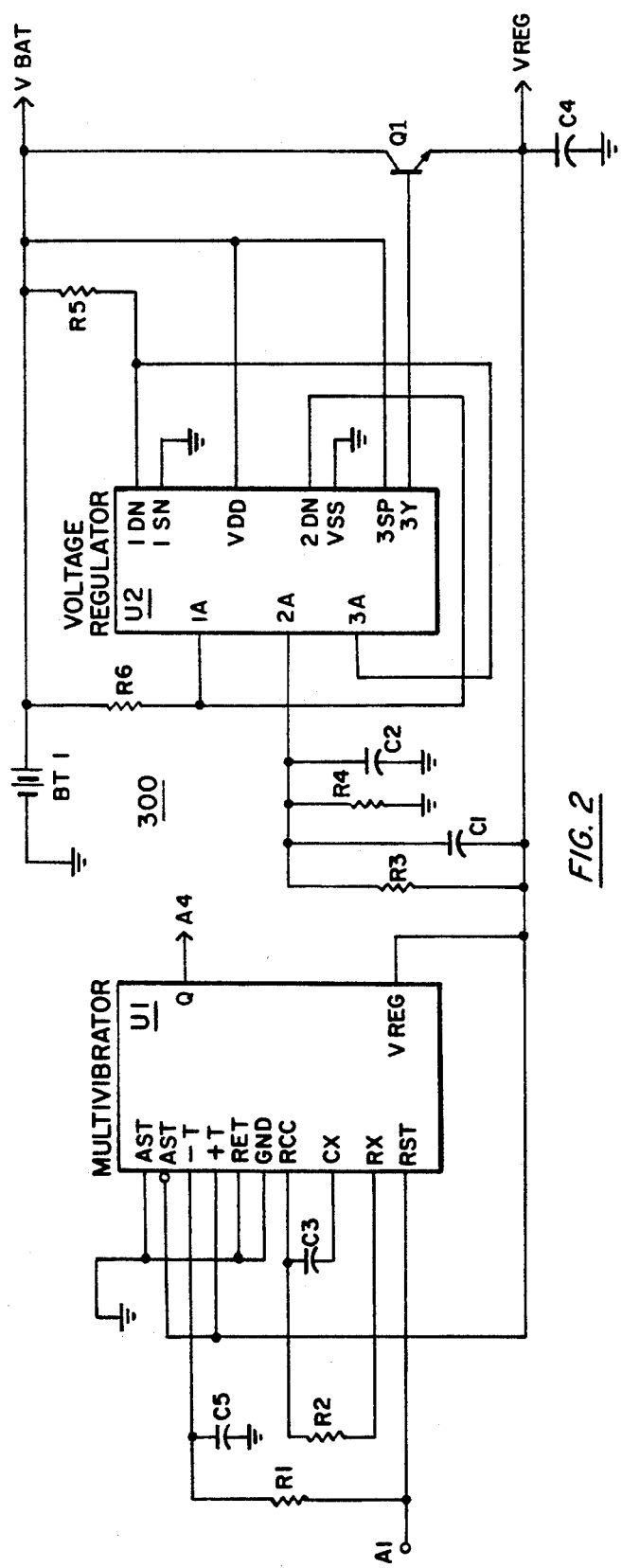
FIG. 2 is a schematic diagram of the transponder energy manager portion of the instant invention.
Figure 6:
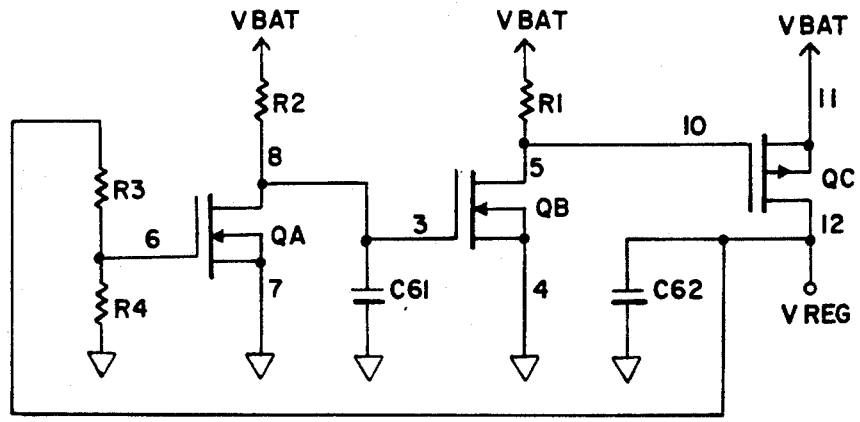
FIG. 6 is a schematic diagram of the voltage regulator portion of the instant invention.

Referring now to FIG. 2, there is shown a schematic diagram of the energy manager 300. The energy manager circuit 300 consists of two major parts:

1. The ultra-low parasitic current voltage regulator, noted previously, which is the MC14007 IC (sometimes referred to as a 4007 IC) U2 and its related components. The MC14007 IC is a CMOS integrated circuit device and includes a collection of ultra-small geometry, ultra-low current, CMOS transistors. In this embodiment, the circuits are connected and used more as discrete circuit components than as an integrated circuit. A representative schematic diagram is shown in FIG. 6 and described infra.

2. The remainder of the energy manager 300 relates to the IC U1 which is a 4047 multivibrator device, used here in a monostable or one-shot mode. The one-shot is powered by voltage Vreg which is a stable low-voltage source which provides minimum power consumption for the multivibrator U1. Of course, the multivibrator will operate on higher and variable voltages. In this embodiment, the one-shot is designed to time-out over a period of about 10 seconds. The resistor R2 and capacitor C3 values are chosen for timing and for ultra-low current consumption. Most of the time, these two parts (i.e. multivibrator U1 and voltage regulator U2) of the transponder are the only components that are in dynamic operation, and they consume only a fraction of a microampere. This is the key to achieving the long life goal.

Figure 3:
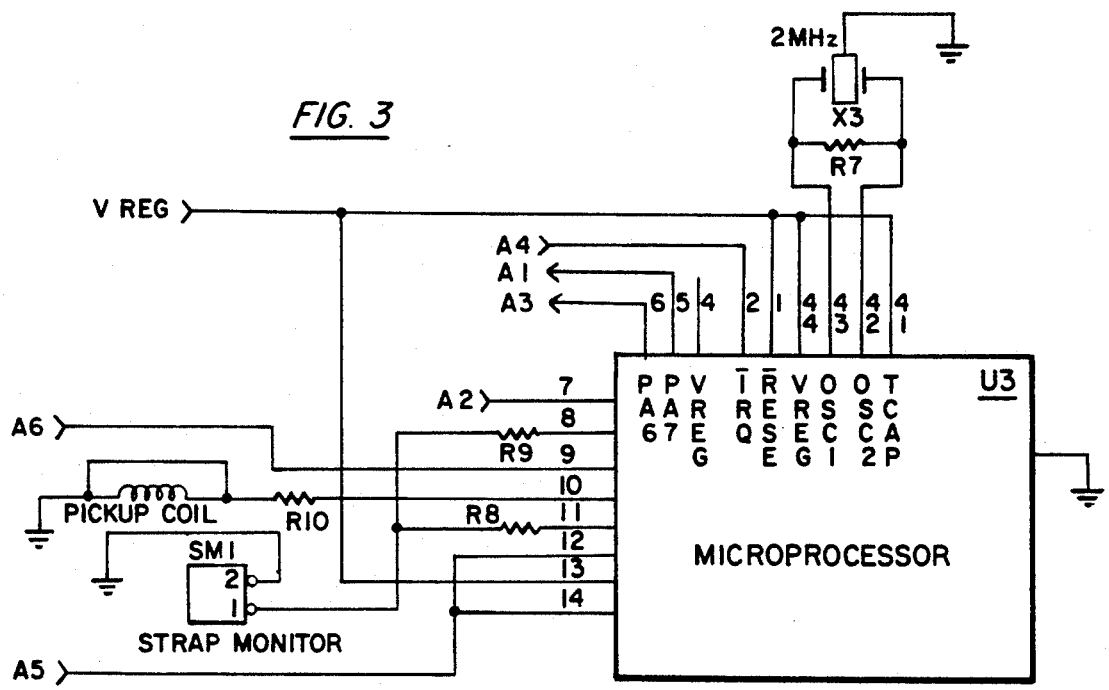
FIG. 3 is a schematic diagram of the transponder processor portion of the instant invention.

The timer U1 is triggered to perform each 10 second timing cycle by the microprocessor which is shown in FIG. 3. After the microprocessor triggers the timer, the microprocessor firmware places the microprocessor in the stop mode, which stops the microprocessor clock and all other switching in the microprocessor. Operating the microprocessor U3 with stopped-clock and low-voltage power furnished by the Vreg voltage source permits it to retain its memory while using, typically, a very small fraction of a microamphere of current.

The U2 portion of the circuit (including transistor Q1 and the associated capacitors C1, C2 and resistors R3, R4) is an ultra-low parasitic current low-voltage regulator which regulates the voltage at Vreg.

The energy manager 300 has been arbitrarily defined as consisting of the voltage regulator U2, the multivibrator U1 and the battery BT1. The energy manager, as a unit, provides the power to the rest of the circuitry; this power is raw battery or regulated, as is appropriate. It furnishes the timing function at ultra-low power to reactivate the microprocessor approximately ten seconds after the microprocessor has turned off.

Referring now to FIG. 3, there is shown microprocessor U3. The microprocessor module port A1 is connected to I/O pin 5 of the microprocessor which is used here as an output. When the firmware that is resident in the microprocessor commands, the microprocessor causes a transition signal on pin 5 that triggers multivibrator U1 and begins a timing cycle as noted above. The microprocessor firmware next places the microprocessor in the stop mode, causing the microprocessor internal clock to stop. Operation of the microprocessor U3 is thereby suspended with only Vreg applied to retain memory. The microprocessor U3 will remain in that condition until some external reactivation event such as a reset or an interrupt signal occurs.

When the multivibrator U2 completes its timing cycle (i.e., about ten seconds), the Q output at pin 10 makes a transition. That transition signal is coupled, through module port A4 (See FIG. 2) to pin 2, the interrupt request pin, of the microprocessor U3. That transition causes the microprocessor U3 to begin executing instructions again.

The purpose of the multivibrator U1 is to permit the microprocessor U3 to remain inoperative and to have a means of activating it periodically. That is, the microprocessor U3 triggers the multivibrator U1, starting a timing cycle, and then stops its own clock. At the end of the 10 second timing cycle, the microprocessor is restored to operation by the timer. This provides a low-power "sleep" mode for the entire transponder, with a period (usually very brief) of wakefulness every 10 seconds so that the transponder can ascertain if any activity is occurring which requires its participation. This permits transponder operation wherever required combined with extremely low energy consumption over the transponder lifetime.

Thus, the overall function of the transponder is to serve as a tag on an inventory item as indicated in U.S. Pat. No. 4,637,950, to Caswell. The transponder is normally placed on the inventory item. In general, a large number of these transponders are found in a storage area which is equipped with interrogation transceivers with which the transponder operates. There can also be interrogation transceivers with limited range antennae arranged in gateway configurations to detect these tagged (transponder-equipped) items passing through, in addition to, or in lieu of, interrogation transceivers arranged to monitor the controlled area in the warehouse or other storage area.

The transponder must be operational and ready to receive and respond to interrogations at any time. At the same time, energy budget goals must be met in order to have a suitable lifetime. However, the receiver cannot remain ON and monitoring constantly and still meet the energy consumption goals. Thus, the microprocessor U3 serves as the overall controller and turns the receiver ON when the receiver needs to be turned ON and turns the transmitter ON when the transmitter needs to be ON. The purpose of this ten-second timing cycle is to permit the receiver to come ON periodically, but briefly, to check for transmitted signals.

To perform this check for transmitted signals, the microprocessor U3 (functioning in its overall transponder controller role) turns the receiver ON and monitors the receiver output. The microprocessor U3 also performs the baseband signal processing function for the receiver. The microprocessor monitors the receiver output and determines whether or not interrogations are, in fact, occurring. Since the receiver output is binary, i.e. either a high or low state, this determination is done by looking at the timing of transitions. If data is being received by the receiver, the transitions will occur nominally at bit times and not at other times. Of course, at any given bit time, a transition may or may not occur, depending on the data being transmitted.

The receiver IC used in the transponder is designed to receive and demodulate a frequency modulated (FM) radio frequency (RF) carrier and produce an analog output by demodulation of the FM signal with a product detector. If the RF carrier is FM modulated with a sine wave, the analog output of the receiver will replicate the sine wave. In the preferred embodiment, the transmission of binary information is desired, and the binary data waveform is used to frequency modulate the RF signal transmitted to the transponder by the interrogation transceiver. This is commonly referred to as FSK data transmission. To provide a clean binary output waveform with the correct levels for input to the microprocessor U3, a voltage comparator circuit (included in the receiver IC) is used. It compares the analog voltage levels from the product detector to a reference voltage. When the analog voltage output from the product detector (which is the input to the comparator) exceeds the preset reference level, the comparator switches to one of two discrete output voltage levels. When the analog voltage falls below the preset reference voltage, the comparator switches to the other discrete voltage level. The voltage levels that the comparator switches between are compatible with the input levels required by microprocessor U3, so that the data demodulated by the receiver IC can now be directly processed by the microprocessor in the transponder.

Referring now to FIGS. 4A and 4B, there are shown schematic diagrams of the receiver and transmitter portions, respectively, of the system. The circuits of FIGS. 4A and 4B are interconnected at the respective terminals Y1, Y2, Y3 and Y4. These circuit portions are related to each other and to the microprocessor U3 shown in FIG. 3. For example, the output to the processor U3 is from pin 15 of U4 which is the receiver IC (FIG. 4B). That output goes to module port A5 which is connected to module port A5 in FIG. 3, where is it connected to the input pins 12 and 14 of the microprocessor U3.

The microprocessor U3 samples the received data many times per bit time; as an example consider eight samples per bit period where a bit period is one millisecond. This is an eight kilohertz sample rate at the input to the microprocessor. The receiver does not recognize any signals but simply processes the RF carrier and recovers the baseband information which it passes on to the microprocessor U3. If a spurious signal is received at the appropriate frequency, the receiver produces an output that is thresholded by the comparator and supplied to the microprocessor. The microprocessor then determines that this signal is invalid in this system and produces no response.

Thus, decision making and similar processes are performed in the microprocessor U3 while the receiver U4 functions as an interface between the microprocessor and the RF environment. As such the receiver is a conventional CMOS FM receiver with low current requirements. However, filtering (including capacitors C26 and C28) on the output is more severe than would normally apply for an audio receiver.

The combination of the lack of DC stability of the demodulator and subsequent gain stages and the high postdetection gain makes DC coupling of the postdetection states not feasible. On the other hand, AC coupling allows the DC level at the input to the comparator (U4 pin 14) to drift in response to the balance between 1's and 0's in the data being received, as well as in response to circuit bias drift and leakages. This results in displacing the comparator threshold voltage from the "midway between 0 and 1 level" that is desired; it causes noise in the thresholded output waveform to the microprocessor. The solution is the clamping diodes D4 and D5. They are hot-carrier schottky diodes, selected for their convenient forward voltage drop (at low current) of about 0.3 volts. At one end, they are connected to the voltage comparator input, U4 pin 14, which is the point that needs to be maintained at a voltage of about 0.3 volts above the comparator threshold voltage if the current data bit is a 1, and about 0.3 volts below the comparator threshold voltage if the current data bit is a zero. The other end of the diodes is connected to U4 pin 17, which is the IC U4's internally regulated voltage which is the comparator threshold voltage. Thus, if the voltage at the comparator input begins to drift too far positive, current will flow through the diode D4 on a 1 data bit to restore the proper DC balance. Similarly, if the voltage at the comparator input starts to drift too far negative, current flows through diode D5 during a 0 data bit to restore the proper DC level. The only additional requirement is that the duration of uninterrupted strings of 1's and of 0's be limited. This is done by introducing "clamping bits", which have no data significance, but are assigned 0 or 1 values as required to be different than the following data bit. The first bit sent in each interrogation sequence is a clamping bit, as is each fifth bit thereafter. Clamping bits are added by the microprocessor in the interrogation transceiver and ignored by the microprocessor in the transponder; they transmit no data. Manchester coding could be used, but would require more transitions in the course of each interrogation, and thus would introduce more noise in the transponder environment of relatively simple signal processing.

The effect of noise on system operation is minimized by use of the narrowest bandwidth possible. In the RF domain this is addressed with intermediate frequency filters of restricted bandwidth. After the received intelligence has been transformed to a baseband signal, low pass RC filters can be used to reduce the signal bandwidth even further. In the preferred embodiment, low cost, readily available intermediate frequency filters with bandwidth suitable for audio applications are used, and a postdetection RC filter then limits the bandwidth appropriately for this application. The data comes in at a bit rate of one kilohertz and anything at higher frequencies is likely to be noise or an interfering signal which should be rejected. The output filter includes resistor R13 and capacitor C9.

As described above, the receiver output is supplied to the microprocessor U3 where it is sampled by the firmware which determines if the frequency of transitions is such that it could be data intended for the system. If it does not appear to be data intended for the system, then the microprocessor immediately, without further operation of the receiver or itself (further operation of either or both would waste energy) turns off the receiver; starts the multivibrator timing cycle for another ten seconds; then stops its own clock and enters the sleep mode.

When the batteries are first connected to the transponder, the power on reset to the microprocessor U3 pin 1 goes high which starts the microprocessor clock. The clock frequency is controlled by crystal X3 in FIG. 3. (The multivibrator U1 starts a timing cycle, too, because its timing capacitor is discharged.) After the microprocessor starts, further operation is under control of the firmware. After the battery has been mounted onto the circuit board, the system has power and remains powered forever until the battery discharges to a point where it can no longer supply a useful terminal voltage whereupon the transponder is replaced. A power ON/OFF switch is not utilized in this embodiment of the circuit. Such a switch could be included in the circuit if so desired.

For the useful life of the transponder, the microprocessor U3 checks the battery BT1 each time the transmitter is operated. When the transmitter is keyed ON by the microprocessor, a heavy current draw exists. If the battery is nearing the end of its useful life, the voltage Vbat will drop sharply. The microprocessor U3 monitors the voltage when the transmitter is turned ON. If the drops in the voltage Vbat exceed a threshold, the microprocessor U3 sets a flag in its memory that the battery is low. This information can be supplied to the system controller when the transponder is interrogated and directed to respond with battery condition information.

In the overall system operation, there will be interrogations looking for transponders with low batteries. If a transponder has a low battery and has identified itself as such (as described above), it will respond to such an interrogation. A maintenance order will then be initiated to replace the transponder on that item.

If the received data from the receiver appears to be noise or, in general, does not have the characteristics of data from the interrogation transceiver, the complete system will be shut down for another ten second cycle. This total check occurs in a time that is of the order of two or three milliseconds duration. The microprocessor U3 (which draws less current than the receiver) will be ON for only a little longer than the receiver. This operation results in an actual ON time of some two milliseconds out of each ten seconds or about 0.02% duty cycle. Thus, while the receiver draws a milliampere or two of current when it is ON, its impact on the energy budget is reduced by a factor of almost 10,000. The time-average-current draw for monitoring the RF environment when interrogations are not occurring is, therefore, far less than a microampere, which meets the operational life objectives of this system.

When the receiver is receiving signals that may be data from one of the interrogation transceivers, the microprocessor has access to a binary-coded version of the unique identification code that is assigned to each transponder. In the present embodiment, that code is stored in a one-time programmable memory as part of the microprocessor U3. It could, in more general terms, be done with jumpers on the circuit board or it could be entered into the microprocessor RAM and retained by the battery voltage, in addition to the option of using PROM. Any of the above options can also be combined with ROM storage of part of the bits.

If it appears that valid data is being transmitted, the microprocessor U3 keeps the receiver operating and continues operating while searching for a distinctive sequence of data which, in the preferred embodiment, occurs at the end of the data transmission.

This distinctive sequence is called a sync character. The sync character includes bits of time duration incompatible with the normal data. In the preferred embodiment, it is a chirp sequence of three one-zero pulse pairs in which the durations of each pair are $\frac{2}{3}$, $\frac{1}{2}$ and $\frac{2}{5}$ of the normal duration of a data pulse pair. These special data are illegal characters which do not occur at other times. The distinctive pattern is used to identify the sync time at the end of the message. Thus, if the microprocessor U3 monitors data that appears to be data from the system but which lasts longer than a complete message without a sync character, it shuts down the receiver and initiates a ten second timing sequence. This is an alternate to the usual shutdown which occurs when the data is found to be not valid.

When the microprocessor U3 receives a sync signal (or what appears to be a sync signal), the position in the transceiver interrogation timing sequence is established. Thus, the microprocessor is informed that the next interrogation is about to occur and when it will start. The microprocessor now shuts off its receiver (because the receiver is not needed until the next interrogation begins) and proceeds to time the duration until the next interrogation sequence should begin. The microprocessor does not time this receiver shutdown with the multivibrator U1 (which is fixed at approximately ten seconds). Rather, it uses a timer included within the microprocessor which shuts down all microprocessor functions except the clock oscillator, the circuit used to count the clock cycles, the circuit which monitors the count, and the circuit which restores program control when a selected count has been reached. This is the precision timing mode of the microprocessor U3 and performs with a high degree of accuracy due to the excellent accuracy and stability of the crystal oscillator used to generate the microprocessor clock.

The precision timing is used for the timing which is associated with the shutdowns during the interrogation sequence. At the end of the timing cycle, the firmware of the microprocessor U3 regains control and proceeds to perform the next operation required.

The basic energy conservation rules are that the receiver is turned off as soon as it is established that it has no work to do, and, similarly, the microprocessor U3 inactivates as soon as it is established that its services are not presently required.

TRANSPONDER TIMING

The microprocessor turns on the receiver and monitors the receiver output. If the receiver output appears to be noise or a spurious signal and not valid data, the transponder shuts down for ten seconds. If it appears that data has begun where it was expected, the microprocessor continues to maintain the receiver powered-up and continues monitoring the data. As the data is received, it is compared with the sequence of data in the microprocessor memory which determines if the transponder should respond or not. That sequence of data includes the unique identification code of the transponder. It also includes the low battery bit noted supra, as well as one or more mute bits. It also includes a removed status bit and one or more spare bits to permit expansion without changing overall timing, or introducing incompatibilities between new transponders and older ones.

The sequence in which these bits are placed in the interrogation transceiver message which is being received by the transponder is also important. The bits are sequenced so that the earliest bits have the highest probability of establishing that the interrogation transceiver message is not for this transponder. The bit that has the highest probability of conveying that information is the first bit. The bit with the second highest probability is the second bit, and so forth. Generally, the low order bit of the transponder identification code is the first bit. The next-to-low order bit is the second bit, and so forth. Then the condition code bits begin to be worked in. The sequence of bits appears to be random but it is not. It is a sequence of bits designed to accomplish the desired result of minimizing energy consumption.

The microprocessor U3 monitors the received data stream. When it receives a data item which indicates that this transponder will not need to respond to this message, the receiver is turned off at once. It initiates precision timing until the beginning of the next interrogator message and is inactivated during its precision timing mode. When it is reactivated in its precision timing mode, it repeats the operation.

All of the routine operations that occur when the microprocessor is not receiving a message to which it is supposed to respond have been described.

TRANSPONDER WAKEUP AND SYNCHRONIZATION

It should be noted that when the interrogation transceiver first sends a message, most of the transponders are inactive and, therefore, unresponsive. Even if the specific transponder to which the message is directed happens to be activated at the beginning of the message, it will not know that this was the beginning of the message and will not be able to interpret the message. That is, the transponder must receive the sync code and establish frame synchronization with the interrogation sequences. Only after that has been done can it interpret an interrogation data message.

Since most of the message time is spent representing data, a transponder will, typically, be activated while the transceiver is sending data. At the end of the data sequence, it receives the sync code and establishes frame sync. Thus, on the next interrogation sequence it can actually process the data. In a typical application, e.g. with a warehouse full of transponder-equipped inventory items, the interrogation transceiver simply starts with an interrogation that it needs to make and continues to repeat that interrogation for a period of time in excess of ten seconds or until it receives a response, whichever comes first. Over a period of time, all of the transponders activate and become synchronized. Then communication with the transponders can and does take place efficiently. When a transponder receives a message that is meant for it alone (or as one of the ambiguous messages, described infra, that are meant for many transponders) and to which it is supposed to respond, it waits until the appointed time space and then turns on its transmitter. It sends an amplitude-modulated, chirped pulse sequence consisting of the data 010101 (0=OFF, 1=ON) with duration of the three pulse pairs being 0.75, 1, and 1.25 milliseconds respectively. This response is transmitted over the return RF link and received by the interrogation transceiver, which, in turn, passes to the computer controlling its operations the information that the response was received. Present timing calls for the transmitter to be turned ON for two milliseconds, i.e. two bit times. Data should be received by the interrogation transceiver and, in turn, passed back to the computer that the response was received.

TRANSPONDER CIRCUIT OPERATION

Referring now to FIGS. 4A and 4B concurrently, the transmitter and the receiver are controlled by power switches operated by the microprocessor U3. The power switch for the receiver is an analog switch integrated circuit U5. In particular, it is an MC14066 switch. The microprocessor controls U5 through module port 2 at U5 pin 13, the control for its section 1.

The receiver operates from the Vreg which is supplied to pin 1 of U5. When switched on by the microprocessor U3, Vreg comes out of pin 2 of the integrated circuit U5. The transmitter, on the other hand, operates off the voltage Vbat, not the low voltage regulated Vreg. The voltage Vbat is switched by the combination of transistors Q5 and Q6. Transistor Q5 acts as a driver to transistor Q6, and transistor Q6 is the actual power switch which turns on the power to the transmitter.

The transmitter is substantially conventional. It is a crystal-controlled transmitter consisting of the oscillator Q4 controlled by crystal X2 at the frequency that is to be transmitted. The crystal X2 is coupled to a driver stage which includes transistor Q3 and which, in turn, drives the output transistor Q2. The output from transistor Q2 is supplied to the antenna LOOP 1. The coupling between transmitter, receiver and antenna is a unique feature. Otherwise, transmitter and receiver are both basically conventional.

Figure 5:
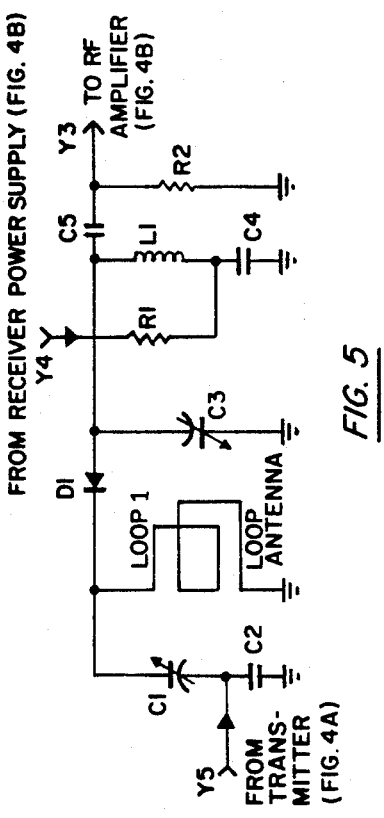
FIG. 5 is a schematic diagram of the transceiver diode switch portion of the instant invention.

Referring now to FIG. 5 there is shown a schematic diagram of the transceiver diode switch. This circuit selectively connects both the transmitter and the receiver of the transponder to the LOOP 1 antenna independently and without electromechanical relays. This is highly desirable because electromechanical relays are expensive and require large quantities of power to operate. It is desired to do this in a way that prevents the receiver from interfering with transmitter operations and vice versa.

The circuit shown in FIG. 5 is related to the antenna and the switch portion. The output arrow Y3 (to the right) goes to the receiver RF input (see terminal Y3 in FIGS. 4A and 4B). The input arrow (at the left) comes from the transmitter RF output (see terminal Y5 in FIG. 4A). The circuit is connected at terminal Y4 to the low voltage source from which the receiver is powered (see terminal Y4 in FIGS. 4A and 4B). The loop antenna LOOP 1 is resonated and matched to the transmitter by capacitors C1 and C2. The tap Y5 between the two capacitors comprises a low impedance point which allows an optimum impedance match between the antenna and transmitter, thus providing good power transfer from the transmitter into the loop antenna. The circuitry including C3 and L1, particularly, serves to help match the antenna to the receiver capacitor.

This circuitry provides a fairly high impedance point at the receiver input which provides efficient power transfer from the loop antenna to the receiver. If the rest of the circuitry including, in particular, diode D1 and resistor R1, were not present, the receiver would be connected to the antenna and would function satisfactorily. Because the transmitter is coupled at a low impedance point, it applies little loading and causes negligible loss of received power. However, when the transmitter operates, it applies relatively large voltages to the loop antenna, and the voltage is increased by the matching network to the input of the receiver. The relatively high-voltage/high-frequency swings result in dissipation and waste of a significant amount of power from the transmitter. Thus, a direct connection between the two has the virtue of simplicity, but results in very poor transmitter performance. (Compromising the matching of the receiver to the antenna is possible and would improve transmitter performance at the expense of receiver performance.) Accordingly, it is desirable to disconnect the receiver from the antenna when the transmitter is to be operated. This function is performed by diode D1, together with the discharge path furnished by resistor R1 and the DC isolation provided by capacitors C4 and C5.

In FIG. 5, resistor R1 goes to a point which will permit the voltage on the anode of diode D1 to discharge. When the transmitter is keyed on by the microprocessor U3, relatively large voltages are suddenly developed across the loop antenna LOOP 1. The result is that whenever the voltage at the top of the loop antenna drops below the voltage on the anode of diode D1 by more than the diode drop, current flows through the diode. The current is furnished by the transmitter output signal. However, in just a few cycles of the transmitter output waveform, the anode of D1 will be charged to a negative voltage (in this embodiment) which results in D1 being back biased and cut off for substantially the entire transmitter cycle of operation.

As a result, diode D1 becomes a high impedance whenever the transmitter is operated so the receiver is effectively disconnected wherever the transmitter is operated. Indeed, it is isolated from the transmitter by the action of the transmitter itself. When the transmitter turns off, the voltage on the anode of diode D1 proceeds to discharge to the receiver power supply through resistor R1. That results in a small forward current flowing through diode D1, which, in turn, couples the loop antenna to the receiver.

Thus, the diode switch uses only one diode because the matching network connects the transmitter at a low impedance point wherein it need not be switched. However, the receiver is connected to a high impedance point and must be switched. A single diode accomplishes the switching and is a key element of the preferred embodiment of the transceiver transmit/receive (T/R) switch.

Use of the diode switch described above makes possible a high efficiency antenna, at lower cost, size, and weight than would otherwise be possible. It is especially advantageous where, as in this application, antenna size is small, typically far less than $\frac{1}{4}$ wavelength. Small antennas such as this suffer from very low "radiation resistance", that is, with the small antenna, a given RF current flowing through the antenna results in far less radiated power. This usually dooms such small antennas to poor performance, but it need not do so. It remains possible to radiate the desired amount of power with a small antenna; the key is to achieve sufficiently large RF current in the antenna. If the antenna is incorporated in a tuned circuit and the losses, other than radiation, in the tuned circuit are small compared to the radiation, good antenna efficiency can be achieved with small antennas. It is conventional to incorporate antennas in tuned circuits, but the unique feature here is successfully minimizing the nonradiation losses from the antenna circuit. In a transceiver application, it is necessary to use the diode switch described above (or some switch, and the diode switch described above is the most economical effective switch known). It is also necessary to achieve low losses in every other part of the antenna circuit. Conductors need to be larger than required in conventional antenna circuits, or superconductors can be used; superconductors are ideal. In this way, high efficiency small antennas can be achieved.

Referring now to FIG. 6, there is shown a schematic diagram of the voltage regulator circuit which includes the transistors inside the package of IC U2. Pins 6, 7 and 8 of the U2 package are connected to similarly designated electrodes of CMOS transistor QA. For example, pin 6 of U2 is the gate electrode of transistor QA. The resistors R3 and R4 (also shown in FIG. 2) connected to pin 6 serve as a voltage divider. The output voltage which is identified as Vreg in FIG. 2 is applied to the voltage divider. Since there is no current of any significance drawn from pin 6 (because it is a MOSFET gate), the voltage on pin 6 is directly proportional to the output voltage Vreg of the regulator.

If the voltage Vreg drifts above the regulated voltage set point, the gate of the MOSFET QA connected to pin 6 IC U2 goes positive which tends to turn on the MOSFET. That, in turn, causes pin 8 which is the drain of the same MOSFET to be drawn down to a lower voltage because of the increased current the MOSFET draws through resistor R6. (The resistor values in this circuit, in general, are extremely high in order to develop voltages suitable for the circuit to function at the extremely low currents which it needs to operate.) Pin 8 is connected to pin 3 of the same IC. This pin is the gate electrode of CMOS transistor QB which provides additional gain. The result of the operation of transistor QB with a decreased voltage on its gate electrode is to cause the voltage at its collector electrode (pin 5) to increase. Thus, the voltage on pin 5 is increased as a result of increase in the output voltage. Pin 5, in turn, is connected to pin 10 which is the gate of MOSFET transistor QC which is a P-channel device. (In this embodiment, transistors QA and QB are N-channel devices.) An increase in the voltage on pin 10 results in cutting off MOSFET QC which has its source electrode (pin 11) connected to the battery source Vbat. The drain electrode of transistor QC (at pin 12) provides the drive to the output transistor which is Q1 in FIG. 2. Thus, as a result of an increase in the output voltage, the current through transistor QC is reduced. The drive supplied to the output transistor Q1 is reduced and the increase in output voltage that triggered this operation is counteracted. This causes the circuit to function as a voltage regulator.

It is clear, however, that no zener diode, reference diode or voltage reference of the usual kind is included in the circuit. Voltage references of that type require more current than is available in this circuit. Devices of the conventional kind cannot be used as the voltage reference and meet the ultra-low energy consumption objectives of this circuit. In this case, the voltage reference that is actually used is, therefore, the threshold ON voltage of the MOSFET QA in IC U2. The threshold voltage of that device largely performs the voltage reference function. While it may not be as precise a voltage reference over a wide temperature range as some other higher power consumption devices, it is satisfactory for this purpose and meets the overriding concern for ultra-low power. Thus, the ultra-low power voltage regulator produces the Vreg which is used in several places in the circuit.

The capacitor C61 is used to provide a roll-off response in order to achieve stability. Typically, it is the smallest capacitance value which prevents oscillation. Likewise, capacitor C62 is used to provide filtering and is of the appropriate size to produce maximum output current until the "rolled-off" feedback amplifier can respond.

Figure 7:
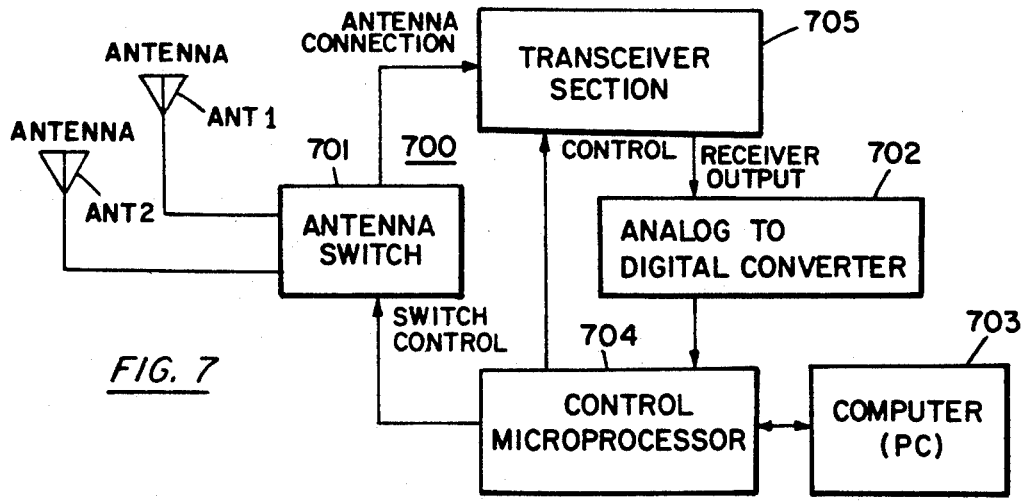
FIG. 7 is a block diagram of a preferred embodiment of the interrogation transceiver of the instant invention.

In FIG. 7, there is shown a block diagram of the interrogation transceiver 700. This element of the inventory control system communicates with the transponders and effectively links them to the computer which controls the inventory control location. The antenna switch 701 and pair of antenna systems (ANT1 and ANT2) shown therein provide a unique and significant capability. Typically, an antenna system operating in a non-free space environment will produce an irregular coverage pattern with nulls of varying depth. If a transponder is located in one of these nulls, communication with it will be subject to additional losses, and can be compromised as a result. The deep (high communication link loss) nulls tend to be very small in spatial extent so that the probability of a given transponder being in precisely the null position and orientation is exceedingly small. However, with a large number of transponders with which communication is required, the nulls nevertheless represent a significant threat to system performance. The multiple antenna systems (two are shown in FIG. 7) are of different polarizations, are in different locations, or are of different types so that the respective null patterns in the operating environment will be different. Since the nulls of concern exist only for an exceedingly small range of transponder positions, the probability of a single transponder being null-positioned in the fields of both antennas is far smaller than the probability of such positioning for a single antenna.

The system can alternate between the antenna systems to assure most reliable communication with a transponder. The preferred embodiment makes use of the analog-to-digital converter 702 to determine the strength of the RF response received from each transponder. This provides a measure of the RF link quality between the interrogation transceiver 705 and the transponder, and facilitates comparison of the RF link quality for the two different antenna systems. The computer 703 includes a database containing inventory status data on the transponder-tagged items. This data will include the identification of the antenna that last provided satisfactory communication with each transponder, as an interrogation time efficiency enhancement. If the RF environment has changed little since last inventory, as will usually be the case, that same antenna will again provide satisfactory communication. If it does not, the other antenna will be tried before the item is declared not presently in inventory. In all cases, whether database information is available or not, both (or all) antennas of a transponder will be tried before a no-response condition is accepted.

The analog-to-digital converter 702 is also useful in other ways. It provides an effective way to encode the received signal data for communication to the microprocessor 704 and digital processing; it permits the interrogation transceiver 700 to perform RF environment monitoring and report the results to the system computer (thus permitting diagnostic output of the existence of harmful interference to the system operator); and it facilitates digitally controlled adaptive setting of the "response received" threshold.

SYSTEM COMMUNICATIONS AND PROTOCOL

Referring now to FIG. 7, there is shown a block diagram of the interrogator transceiver which interfaces the transponder's radio signals to a controlling computer device 703. A typical application uses a conventional personal computer such as a PC. There may be several interrogators connected to the PC to expand RF coverage. The interrogator communicates using RS232 or RS422 serial communication protocol, at 2400 baud, 8 bits, 1 stop, 1 start, no parity.

The PC 703 must always be ready to receive serial data from all interrogators connected to it at all times. The interrogators may not be ready to send or receive data at any time. All interrogators work independently of other interrogators. The PC must coordinate actions taken by the interrogators.

Information is sent between the interrogator and PC using variable size parameter blocks. The interrogator will send a parameter block when it completes a successful or unsuccessful RF communication with the transponders or in response to a command issued by the PC. The PC will send a parameter block when it wants to command the interrogator to send status information or to communicate with a transponder. Typical signals and formats are described herewith:

PC sent Parameter Block (all commands except Reset):
  Command: Number corresponding to a command.
  Length: Total number of bytes being sent (including Command & Length).
  Data: Optional variable sized data for command. The data can be at most 6 bytes.
P/C Commands:

Nothing: A '0' byte causes no response from the interrogator. No Length, no data. This is a one byte parameter block.

Reset: Clear Filters, Initialize communication parameters from ROM. This is the same as a power-on reset. Command=16, no Length, no data. This will halt execution of all interrogator commands and return the interrogator to Offline Mode, ready for commands. This is a one byte parameter block. It may be necessary to send more than one Reset command to interrupt an executing command. If the command is expecting more data, a reset command may be interpreted as data instead of a command.

Ping: A ping simply tells an interrogator to send an 'Acknowledge' signal back to the PC to indicate that it is on line. It is possible that the interrogator is busy, in which case the response may be delayed. If the interrogator is disconnected or stuck in a function, no response will occur at all. Use the Reset command to get the interrogator out of command modes if it does not ping. Command=1, Length=2, No Data.

Offline: Discontinue monitoring receiver data. The interrogator will completely ignore the received signals. Command=1, Length=2, No data.

Online: Resume monitoring receiver data. Command=3, Length=2, No data.

Transmit: Transmit a message. The interrogator will transmit 41 bits stored in 6 bytes of data to form a complete interrogation message. The interrogator will add the clamp bits, so don't include any. Command=9, Length=8, data is 6 bytes. To allow back to back interrogations, the interrogator will send to the PC a single byte (value=1) during the transmission to trigger new interrogation data from the PC. This is the only command that results in an acknowledge before command execution is completed.

The first data byte, bit 0, contains A0 of the transponder ID. The following bits and bytes hold the rest of the transponder ID and control bits.

Data Sequence #1: Bit 0 . . . Bit 7
Data Byte 1: A0,A1,A2,A3,Mute Override/Normal,A4,A5,A6,
Data Byte 2: A7,Removed,Battery Low,A8,A9,A10,A11,Spare 1,
Data Byte 3: Spare 2,A12,A13,A14,A15,A16,A17,A18
Data Byte 4: A19,A20,A21,A22,A23,A24,A25,A26,
Data Byte 5: A27,A28,A29,A30,A31,Mute & Spare Set Enable, Mute Value,Spare 1 Value,
Data Byte 6: Spare 2 Value.
Data Sequence #2: Bit 7 . . . Bit 0
Data Byte 1: A6,A5,A4,Mute Override/Normal,A3,A2,A1,A0
Data Byte 2: Spare 1,A11,A10,A9,A8,Battery Low, Removed,A7
Data Byte 3: A18,A17,A16,A15,A14,A13,A12,Spare 2
Data Byte 4: A26,A25,A24,A23,A22,A21,A20,A19,
Data Byte 5: Spare 1 Value,Mute Value, Mute & Spare Set Enable,A31,A30,A29,A28,A27,
Data Byte 6: 0,0,0,0,0,0,0,Spare 2 Value.
Measure Background: Have Interrogator sum the level of received signal for the number of samples specified by the data byte. Command=8, Length=3, Data=Number of Samples (one byte).

Set Detector Threshold: Set the threshold level separating a 1 or 0 in the chirp 345 detector. Use 'Measure Detector' to compute the background noise in order to compute this threshold value. The chirp 345 detector is used to detect the transponder response if any. Command=6, Length=4, Data=-threshold value (MSB first, then LSB). This value is initialized by reset.

Horizontal: Select the horizontal antenna. Command=4, Length=2, No Data. Reset selects the vertical antenna.

Vertical: Select the vertical antenna. Command=5, Length=2, No Data. Reset selects the vertical antenna.

Generate Noise: Transmit 2 Khz tone continuously. Command=12, Length=2, No Data. A 2 Khz tone looks like high frequency noise to the transponders. This is useful in blocking some background signals like a cordless phone that generates a carrier that the transponders may think is a wake up call. This 2 Khz tone will cause the transponders to turn off quickly.

Version: This command returns the software version of the interrogator. Command=11, Length=2, No data.

Measure Detector: This command returns the sum 'n' samples of the chirp 345 detector to the PC. Command=7, Length=3, Data=Number of Samples (one byte).

In response to a command, the interrogator will send a parameter block back to indicate its status. Except for responses to the Transmit, Nothing, and Reset command, the responses will be sent in a parameter block as shown below.

Interrogator Sent Parameter Block:
  Status: Number corresponding to the type of response from PC command or transponder communication.
  Length: Number of bytes total (including Command & Length byte)
  Data: Optional data for response.

Interrogator Status:
  Acknowledge: Interrogator signals that it has successfully completed the command. Status=1, Length=2, No Data. The acknowledge response from a Transmit command, however, is only 1 byte of value 01 (hex).
  Chirp Received: The Interrogator has received a transponder response signal. Chirp Received will occur only during interrogations. The value it returns indicates the strength of the signal it received. If multiple interrogators are used, the interrogator that received the greatest value is probably closest to the transponder. Use the Set Detector Threshold command to control the sensitivity of this response. Status≧4, No Length, No Data. This is a one byte parameter block.
  Sample: The Interrogator has sampled the receiver for the specified number of samples. Status=4, Length=4, Data=16 sum (MSB first).
  Chirp Value:
    The Interrogator has sampled the chirp detector for the specified number of samples. The sum is returned. Status=7, Length=4, Data=16 sum (MSB first).
  Version: Interrogator software version information. This command returns the software version number. Status=6, Length=3, Data=version number byte.

Exceptions: Due to tight timing requirements during continuous interrogations, the Transmit command will respond only with 1 byte responses. A byte of value 01 will be used as an acknowledge. Begin sending the next interrogation command as soon as this acknowledge byte arrives in order to maintain continuous interrogations. A byte of value greater than or equal to 4 indicates that the interrogator has received a chirp response from the transponder. Also, the chirp response byte is sent one interrogation late from the PC programmer's perspective. That is, if a transponder sends a chirp response due to the first interrogation, the PC will not receive the information until it has sent the second interrogation. The reason for this is that the interrogator reads in a second interrogation command while it is transmitting the first interrogation command. By the time the first interrogation command is transmitted, the second command has been read in. At this time, the transponder may (or may not) make a chirp response, which is passed as soon as possible to the PC by the interrogator.

PC Requirements:
Since the PC knows the most about what is going on, it is responsible for coordinating actions of the interrogators. One thing the PC must do is to tell the interrogators when to do a background noise check and update so that the interrogator can set detector values for optimum performance. This should be done when the PC expects that there are no RF signals being sent by the interrogators or transponder.

The PC must also have an input buffer on each RS232 receive channel connected to an interrogator. The PC must always be ready to receive data from the interrogator. The PC may need to wait to send data until the interrogator signals that it is ready to receive.

Transponder Protocol:
As each transponder receives an interrogation, it processes the data serially. If a given transponder finds a bit which precludes a response from it, it immediately enters wait mode until the next interrogation and does not send a response to the interrogator. As long as the received data is consistent with a response from a given transponder, that transponder continues receiving and processing the data. If the end of the interrogation is reached and the entire interrogation calls for a response from this transponder, the transponder enters wait mode until time to transmit the response, transmits the response, then enters wait mode until the next interrogation.

ID Code:
  The ID code is bits A31–A0. They constitute a 32 bit transponder identification number; a unique ID code is assigned to each transponder. If every bit in the ID code given in the interrogation matches the corresponding bit of the ID code of the transponder, then the ID code test is passed, and a response is appropriate if all other tests are passed. The only conditions under which a response is possible without a complete match of ID codes are given below under All Respond.

All Respond:
  If any 4 bit nibble of the ID code has the value 1111, the transponder will regard it as a match for the corresponding 4 bits of the transponder ID code. As an example, if bits A0–A3 (the first-transmitted nibble of the ID code) are 1111, all transponders will stay active and continue to process the interrogation (assuming status bit consistency with that action; see below). If the bits A0–A7 are 00111100, so that A2–A5 are 1111, there is no all respond code because A2–A5 is not one nibble; it is parts of two adjacent nibbles. If the entire ID code in the interrogation (bits A31–A0) is 11111111111111111111111111111111, all transponders will respond as if each had been sent its own ID code.

Transponder Status Bits:

The status bits work similarly to the ID bits. If any status bit fails to satisfy the needed requirements, the transponder will enter wait mode until the next interrogation and not send a signal to the interrogator. All status bit conditions must be met in order for the transponder to send a pulse to the interrogator.

Mute Override:

If the Mute Override bit is set in the interrogation message, the transponder will continue to process the message whether its internal mute flag is set or reset. If the Mute Override bit is cleared in the interrogation message, the transponder will continue only if its own mute bit is cleared.

Removed:

If the Removed bit is clear in the interrogation message, the transponder will continue to process the message whether its internal removed flag is set or reset. If the Removed bit is set in the interrogation message, the transponder will continue to process the message only if its own internal removed bit is set.

Battery Low:

If the Battery Low bit is clear in the interrogation message, the transponder will continue to process the message whether its internal Battery Low flag is set or reset. If the Battery Low bit is set in the interrogation message, the transponder will continue to process the message only if its own internal Battery Low bit is set.

Spare 1:

If the Spare 1 bit is clear in the interrogation message, the transponder will continue to process the message whether its internal Spare 1 flag is set or not. If the Spare 1 bit is set in the interrogation message, the transponder will continue to process the message only if its own internal Spare 1 bit is set.

Spare 2:

The Spare 2 bit works exactly like a second Mute bit.

Example of Interrogator Usage:

The first action a program may take is to verify that the interrogator is connected to the PC. Start off by sending eight reset commands. The reset commands will clear out any currently executing commands that may have resulted from stray RS232 signals, and also clear the interrogator RS232 receive buffer. Next send the Ping command and wait a short while for a response. If the response doe not occur within a fraction of a second, the interrogator is not properly connected to the PC.

After verifying that the interrogator is properly connected, setting up the interrogator for communication with the transponder is needed. First, the vertical or horizontal antenna needs to be selected. Next, the Chirp Detector threshold needs to be set. The Measure Detector command can be used to get the average strength of the RF noise level seen by the Chirp Detector. This average noise level can then be used as the basis for an appropriate detector threshold. Set the Chirp Detector threshold using the Set Detector Threshold command.

Now that the interrogator is set up, the Transmit command can be used to interrogate the transponders.

Examples Of All Respond Code Use:

Gateway: By repetitively interrogating in an area, the system can determine if any tag or tags are present or pass through.

Identification of Unknown Transponders:

If a response is received in a gateway or other interrogation involving all respond codes so that the system does not know the identity of the responding transponder or transponders, they can be identified. As an example, assume that a large number of unknown transponders and also a large number of known transponders are present; a procedure for identifying each of the unknown transponders is given below. Details of the procedure can be varied to optimize the search for smaller expected numbers of transponders; changes can also be made to optimize the search for cases where all ID codes are not equally probable.

1. Issue a series of ALL RESPOND, MUTE RESET, interrogations.
2. Issued ID code specific MUTE SET interrogations to all the known transponders.
3. Issue an ALL RESPOND, MUTE NORMAL interrogation. All unknown transponders will respond. This confirms that unknown transponders are present. All subsequent interrogations in this procedure are MUTE NORMAL unless stated otherwise.
4. Issue an interrogation with the first-transmitted nibble of the ID code (A0–A3) set to 0000 and the rest of the ID code set to ALL RESPOND. If a response is received, at least one of the unknown transponders has A0–A3=0000. For purposes of this example, assume that no response is obtained.
5. Issue an interrogation with the first-transmitted nibble of the ID code (A0–A3) set to 0001 and the rest of the ID code set to ALL RESPOND. If a response if received, at least one of the unknown transponders has A0–A3=0001. For purposes of this example, assume that a response is obtained.
6. Issue an interrogation with the first-transmitted nibble of the ID code (A0–A3) set to 0001, the second-transmitted nibble of the ID code (A0–A3) set to 0000, and the rest of the ID code set to ALL RESPOND. If a response is received, at least one of the unknown transponders has A0–A3=0001 and A4–A7=0000. For purposes of this example, assume that no response is obtained.
7. Issue a series of interrogations with the first-transmitted nibble of the ID code (A0–A3) set to 0001, the second-transmitted nibble of the ID code (A0–A3) incremented by 1 each time, and the rest of the ID code set to ALL RESPOND. When a response is received, at least one of the unknown transponders has A0–A3=0001 and A4–A7=<value for which response was received>.
8. Continue in this way, nibble by nibble, until the complete ID code of one of the unknown transponders is determined. Then, issue an ID-specific MUTE SET interrogation to that transponder.

9. Resume the search for unknown transponders by incrementing the last-transmitted nibble (bits A28-A31) by 1 and using the previously-determined 7 first-transmitted nibbles. Continue incrementing the last-transmitted nibble until all unknown transponders with those 7 first-transmitted nibbles have been found and muted.
10. Next, continue the search by using the previously-determined 6 first-transmitted nibbles (bits A0-A23), incrementing the seventh-transmitted nibble (bits A24-A27) by 1 each time, and using ALL RESPOND for the last-transmitted nibble (bits A28-A31).
11. Each time a response is received, proceed to identify and mute all transponders with those 6 first-transmitted nibbles, using the procedure of steps 8 and 9.
12. Then, proceed in the manner of steps 10 and 11 to identify and mute the transponders found by incrementing the sixth-transmitted nibble, the fifth-transmitted nibble, and continuing until all the unknown transponders have been identified.

Battery Low Check:
By periodically issuing a series of interrogations with low battery status and all respond ID codes, the system can determine if any transponders with low batteries are present in the storage area.

Removed Check:
By periodically issuing a series of interrogations with removed status and all respond ID codes, the system can determine if any removed transponders are present in the storage area.

Transponder Operation:
Approximately every 10 seconds, the transponder will turn on the CPU and receiver circuitry and test the RF environment to see if there is a signal being sent to it. If the transponder detects a carrier, it will try to synchronize itself to a sync pulse that it expects to find. If the transponder detects the sync pulse, it will then begin to process the signal. The transponder processes the signal by reading the ID and command/status bits. The transponder will continue processing until it detects that the signal is no longer being sent. The transponder will shut down its circuitry for a 10 second interval every time it detects that there is no signal being sent to it.

User Memory In Transponder:
The existing system has the capability to provide user accessible read/write memory in the transponder. The memory exists, and firmware additions to the protocol can readily be provided to write to the user memory and read the user memory. Reading should be minimized, since transponder transmitter operation requires significant energy. When reading is performed, it should take the form of "smart reading"; that is, based on all sources of data available to the PC, the PC should predict what an optimally-sized (for the application) block of data from the transponder will be, send the predicted data to the transponder, and the transponder will then indicate that the prediction is correct or not correct; if not correct, the transponder can send corrections or the PC can make another prediction, probably of a smaller block. The size data block which constitutes optimal is a function of the predictability of the data to be read; if the data is completely unpredictable, there is no benefit in this procedure, and the data must be read out bit by bit. If, on the other hand, large blocks of data can be predicted with reasonable hope of success, the prediction should be based on large blocks of data. The key is to minimize the amount of data actually transmitted by the transponder.

Thus, there is shown and described a unique design and concept of a inventory management system. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

We claim:

1. An inventory management control system comprising,
   transponder means for selectively generating and receiving an RF signal,
   processor means connected for controlling the operation of said transponder means,
   energy manager means including multivibrator means and voltage regulator means,
   said energy manager means connected for controlling the operation of said transponder means and said processor means so as to establish a duty cycle which requires a minimized utilization of energy thereby,
   transceiver means,
   antenna means connected to said transceiver means,
   analog-to-digital converter means connected to said transceiver means to measure the strength of the signal received at said antenna means, and
   computer means connected to said converter means to operate on the signal received at said antenna means.

2. The system recited in claim 1 wherein,
   said voltage regulator means produces a regulated voltage output.

3. The system recited in claim 1 wherein,
   said antenna means includes a plurality of antenna devices with different operating characteristics.

4. The system recited in claim 3 including,
   switch means connected to each of said antenna devices.

5. The system recited in claim 1 wherein,
   said computer means operates said switch means to select which of said antenna means is connected in circuit with said controller means as a function of the strength the RF signal provided by each of said antenna devices.

6. The system recited in claim 4 wherein,
   said switch means includes,
   diode means having an anode and a cathode,
   first impedance means for connecting said anode to a constant power source,
   output means connected to said anode, and
   second impedance means for connecting said cathode to a variable input source whereby said diode means is selectively back biased by said constant power source via said first impedance means in response to signals from said variable input source.

7. The system recited in claim 1 wherein,
   said computer means includes a microprocessor for supplying a switch control signal to said antenna means.

8. The system recited in claim 1 wherein,
said computer means includes a computer device to coordinate the operation of the system.

9. The system recited in claim 1 including,
battery means connected to said voltage regulators to supply the voltage signal which is to be regulated.

10. The system recited in claim 9 wherein,
said multivibrator means produces periodic output signals.

11. The system recited in claim 1 wherein,
said voltage regulator comprises a plurality of MOSFET devices each having gate, drain and source electrodes,
said source electrodes all connected to a common voltage source,
the gate electrode of a first one of said MOSFET devices connected to the drain electrode of a second one of said MOSFET devices via a voltage divider network,
the drain electrode of each MOSFET device connected to a common reference voltage level, and
the gate electrode of each MOSFET device other than said first MOSFET device connected to the source electrode of the preceding MOSFET device.

12. The system recited in claim 1 wherein,
said antenna means is responsive to RF signals.

* * * * *